(12) United States Patent
Maltz

(10) Patent No.: US 8,395,815 B2
(45) Date of Patent: Mar. 12, 2013

(54) SYSTEM AND METHOD FOR MODELING HIGHER DIMENSION COLOR RESPONSE

(75) Inventor: Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 915 days.

(21) Appl. No.: 12/499,874

(22) Filed: Jul. 9, 2009

(65) Prior Publication Data

US 2011/0007332 A1    Jan. 13, 2011

(51) Int. Cl.
*H04N 1/60* (2006.01)
*G06K 15/00* (2006.01)

(52) U.S. Cl. ........ 358/1.9; 358/2.1; 358/1.15; 358/3.27; 358/1.13; 347/189; 347/194; 382/100

(58) Field of Classification Search .................... 358/1.9, 358/2.1, 1.15, 3.27, 1.13; 347/189, 194; 382/100

See application file for complete search history.

(56) References Cited

U.S. PATENT DOCUMENTS

| | | | |
|---|---|---|---|
| 5,473,439 A * | 12/1995 | Pappas ........................ | 358/3.27 |
| 5,858,601 A | 1/1999 | Ong et al. | |
| 6,335,800 B1 | 1/2002 | Balasubramanian | |
| 6,747,758 B1 * | 6/2004 | Nishida ........................ | 358/1.9 |

OTHER PUBLICATIONS

U.S. Appl. No. 12/273,918, filed Nov. 19, 2008, Mestha et al.
U.S. Appl. No. 12/463,469, filed May 11, 2009, Lieberman et al.

* cited by examiner

*Primary Examiner* — David K Moore
*Assistant Examiner* — Quang N Vo
(74) *Attorney, Agent, or Firm* — Philip E. Blair; Fleit Gibbons Gutman Bongini & Bianco P.L.

(57) ABSTRACT

What is disclosed is a novel system and method for implementing a color model function for a printer that uses a relatively large number of colorants. The model is based upon several four color printer color models that contain more complete color models by storing output data for a higher number of input color value combinations and a small number of additional measurements that characterize the response of the printer to outputs using more than four colorants. Results from more complete printer models are determined and combined with a CMYKOV printer model that stores output values for only a coarse resolution of inputs. Transitions between various regions of color space defined by the colorant model definitions are then smoothed. A higher dimension printer color model output is produced. The present method effectively determines a higher dimension color printer model output corresponding to values of an N+2 dimension color model input.

20 Claims, 6 Drawing Sheets

SYSTEM AND METHOD FOR MODELING HIGHER DIMENSION COLOR RESPONSE

TECHNICAL FIELD

The present invention is directed to systems and methods for determining printer color model outputs corresponding to input colors.

BACKGROUND

The printer model is a key component of a color management package. High speed printer models generally determine output Lab values by using multi-dimensional lookup tables (LUTs) with interpolation between values stored in the table. However, a six color printer model with a reasonable number of colorant levels (e.g., thirteen) requires $13^6$ values, or almost 5,000,000 entries. Many of the entries would not contain data of interest. For example, six color printers often use cyan and orange. But these two colorants tend to produce a slightly cyanish gray color which can be obtained by other means. One can attempt to solve this problem by only using printer models for subsets of input color dimensions corresponding to the colorant formulations used most often. In such an architecture, transitioning between formulations for different sub-printer-models, such as when printing a range of colors that span from a OMYK printer model to a CMYK printer model, additional color mixtures beyond the four colors of these sub-printer models can be encountered. Previous methods have encountered discontinuities when handling such transitions. Further, discontinuities may be encountered when transitioning from one of the four colorant sub-combinations to another.

Accordingly, what is needed in this art are increasingly sophisticated systems and methods for determining lookup table-based color model transfer functions that accept more than four color inputs.

BRIEF SUMMARY

What is disclosed is a novel system and method for implementing a color model function for a printer that uses a relatively large number of colorants. The color model is based upon several four color printer color models that contain more complete color models by storing output data for a fairly large number of input color value combinations and a small number of additional measurements that characterize the response of the printer to outputs using more than four colorants. Results from more complete CMYK, OMYK, and CMVK printer models are determined and combined with a CMYKOV printer model that stores output values for only a coarse resolution of input values. Transitions between the various regions of color space defined by the four colorant model definitions are then smoothed. A higher dimension printer color model output is produced. The present method effectively determines a higher dimension color printer model output corresponding to values of an N+2 dimension color model input.

In one example embodiment, the present system and method for determining a higher dimension color printer model output corresponding to values of an N+2 dimension color model input includes maintaining a first N+1 dimension color model for a first N+1 color dimensions and a second N+1 dimension color model for a second N+1 color dimensions. The first N+1 color dimensions and the second N+1 color dimensions each include N common color dimensions and, respectively, a first additional color dimension and a second additional color dimension. The second additional color dimension is different from and represents a complementary color of a color represented by the first additional color dimension. A low resolution higher dimension color model for at least N+2 dimensions that include the first additional color dimension, the second additional color dimension, and the N common color dimensions, is maintained. The low resolution higher dimension color model has fewer calibrated data nodes for substantially fewer input values per dimension than the first N+1 dimension color model and the second N+1 dimension color model. A higher dimension color model input comprising at least N+2 values corresponding to a first additional color dimension value, a second additional color dimension value, and N common color dimensions values is accepted. A first intermediate output and a second intermediate output are determined based upon data stored in the low resolution higher dimension color model. A first N+1 dimension color model output and a second N+1 dimension color model output corresponding to the N common color dimension values and, respectively, to the first additional color dimension value and the second additional color dimension value using, respectively, the first N+1 dimension color model and the second N+1 dimension color model are determined. A first estimated output and a second estimated output corresponding, respectively, to an output proportionately between, based upon the second additional color dimension value, the first intermediate output and the first N+1 dimension color model output, and a value proportionately between, based upon the first additional color dimension value, the second N+2 dimensional intermediate output and the second N+1 dimension color model output are interpolated. The first estimated output and the second estimated output in respective proportion to the first additional color dimension value and the second additional color dimension value are combined into a higher dimension color model output. The higher dimension color model output is outputted.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for efficiently implementing a color model function for a printer that uses a relatively large number of colorants. The present method effectively determines a higher dimension color printer model output corresponding to values of an N+2 dimension color model input.

It should be understood that one of ordinary skill in this art should be readily familiar with the color model transformations between various color spaces used in printing and the characterization of various print devices, including interpolation techniques used to enhance model accuracy. One of ordinary skill would also be knowledgeable about computer science, and software and hardware programming systems and methods sufficient to implement the functionality and capabilities described herein in their own document system environments without undue experimentation.

Definitions

"Color Space," as used herein, refers to a mathematical model defining color representations as tuples of numbers. Color models referred to herein are able to include any suitable number of color components, including 3, 4, and 6 color component color models.

"Lab Values" refer to numeric values in the Lab color space. The Lab color space is a color-opponent space with dimension "L" for lightness and dimensions "a" and "b" for the color-opponent dimensions. The Lab color space is based on nonlinearly-compressed CIE XYZ color space coordinates.

"Color Model" refers to a mapping relationship between an input color space and an output color space.

"Complementary Color" refers to a relationship of a color to a first color that, when the color and the first color are combined, result in a substantially neutral color such as gray or black.

"Color Dimension" refers to a color component within a color model. A four colorant color model has four color dimensions, and a six colorant color model has six color dimensions.

"High Resolution Color Model" refers to a color model that defines output color values for a large number of input color values.

"Low Resolution Color Model" refers to a color model that defines output color values for a small number of input color values. Low resolution color models define output color values for substantially fewer different input color values than a high resolution color model.

"Color Model Input" refers to a representation of a particular color in an input color space for a particular color model.

"Color Model Output" refers to a representation of a particular color in an output color space for a particular color model.

"Upper Range Input Value" refers to a color model input for a low resolution color model for which a output color value is defined by the low resolution color model.

Example Processing Data Flow

Figure 1:
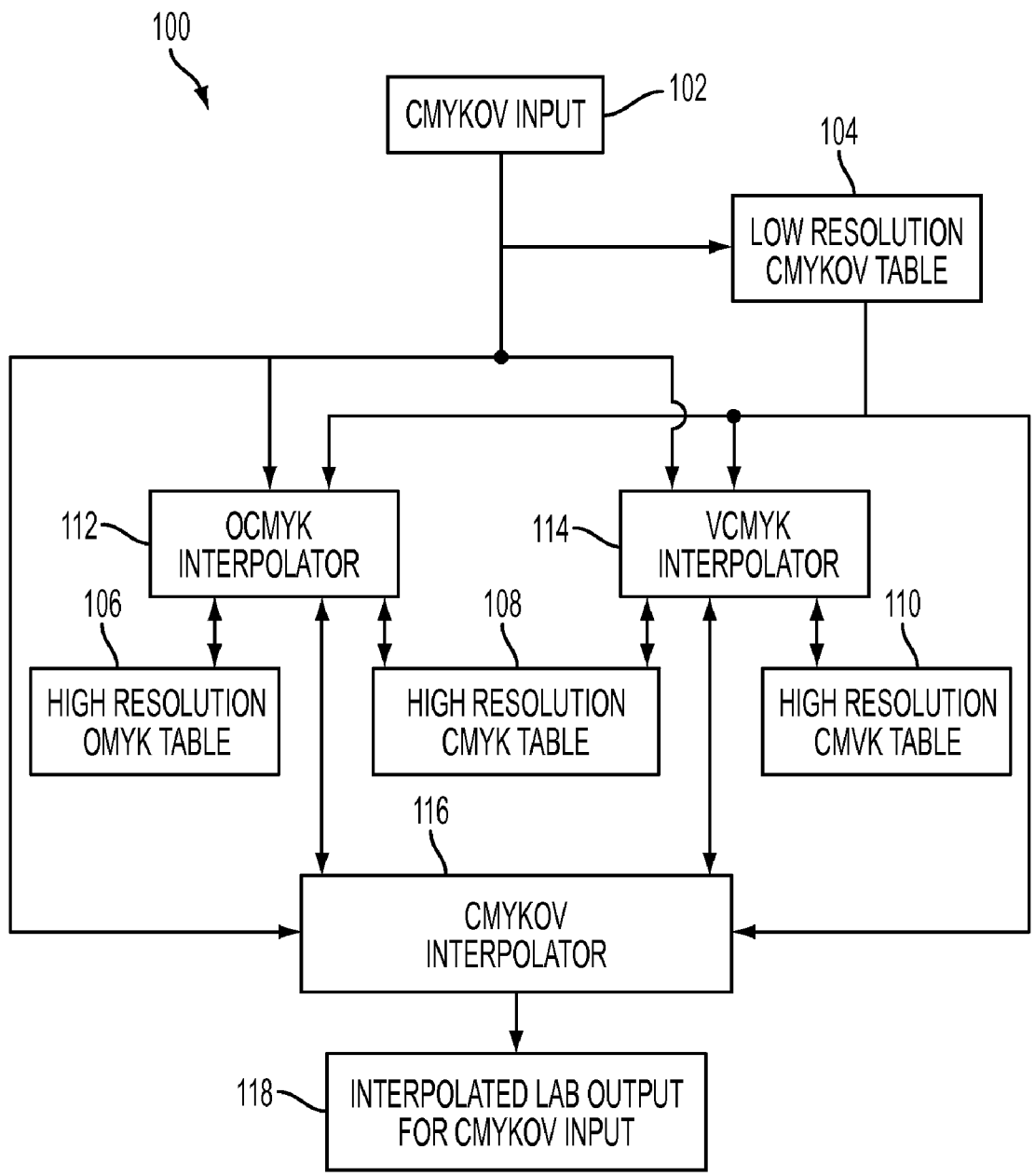
FIG. 1 is a process data flow illustrating one embodiment of the present method for efficiently implementing a color model function for a printer that uses a relatively large number of colorants.

Reference is now made to FIG. 1, which is a process data flow illustrating one embodiment of the present method for efficiently implementing a color model function for a printer that uses a relatively large number of colorants. The example processing data flow 100 illustrates a processing data flow that accepts a six color CMYKOV input 102, which contains six independent values for each of the six color dimensions of Cyan, Magenta, Yellow, black, Orange, and Violet. Printer model data that is stored in a number of look-up tables is used to produce an interpolated Lab output 118 that corresponds to the received six color CMYKOV input. As described below, the example processing data flow provides an alternative to maintaining a large look-up table that contains Lab output values for many of the combinations of levels of the six values possible in the CMYKOV input. The example processing data flow utilizes four color models that are stored as look up tables. Each look-up table of a color model contains a subset of data required to produce the entire range of Lab output values that correspond to the full available range of CMYKOV input values.

Look up tables of the present method include a low resolution CMYKOV table 104. The low resolution CMYKOV table 104 is referred to as a "low resolution" table because it contains Lab output values for only a relatively few levels of each of the six dimension values of the CMYKOV input. The low resolution CMYKOV table is able to produce a coarse approximation of an Lab output value for a given CMYKOV input. As described below, the present method uses other tables, referred to as "high resolution" tables, that contain Lab output values for more levels of a subset of the six CMYKOV color dimension values. For example, the example processing data flow 100 includes a high resolution OMYK table 106, a high resolution CMYK table 108, and a high resolution CMVK table 110. The high resolution OMYK table 106 contains Lab output values for many levels of the four OMYK color dimension values contained within the six CMYKOV values. Similarly, the high resolution CMYK table 108 contains Lab output values for many levels of four CMYK color dimension values and the high resolution CMVK table 110 contains Lab output values for many levels of four CMVK color dimension values. Determination of output Lab values based upon the corresponding four input color values for a high resolution table is able to further entail extrapolation between stored values.

The operation of the present method combines the data contained in these four printer models to provide improved Lab output values for the six value CMYKOV input. The present method therefore allows three smaller, four color dimension look-up tables to be stored along with a low-resolution six color look-up table to be used to provide sufficiently accurate Lab output values for six color dimension inputs. The look-up tables used by the present method are generally smaller and more easily processed than would be a much larger six color dimension input look-up table that stores data for the same resolution of input values.

The example processing data flow 100 includes two five level interpolators, an OCMYK interpolator 112, and a VCMYK interpolator 114. As is described in detail below, each five level interpolator accesses data stored in two corresponding high resolution four color model look-up tables and receives the Lab output value from the low resolution CMYKOV table 104 to determine interpolated Lab values for two combinations of five color values within the six color values of the CMYKOV input 102. In this example, the two five level interpolators determine interpolated Lab values that correspond to the five color dimensions of OCMYK and VCMYK within the six color dimensions of the CMYKOV input 102. These interpolated five color space output Lab values are provided, along with the output Lab values from the low resolution CMYKOV table, to the CMYKOV interpolator 116. Based upon these inputs, the CMYKOV interpolator 116 determines and outputs interpolated Lab values that correspond to the six color CMYKOV input values 102.

Figure 2:
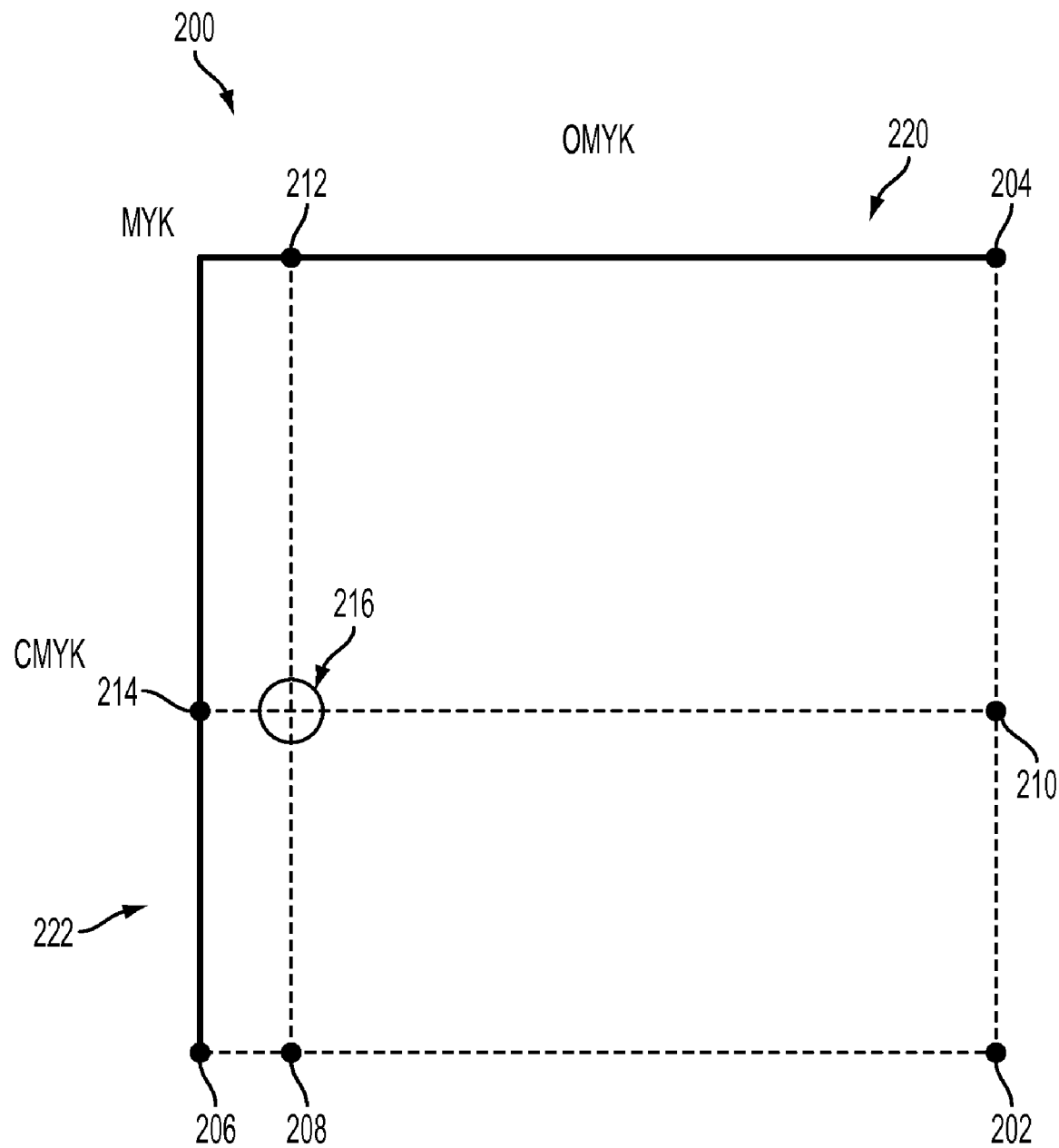
FIG. 2 is a two dimensional representation of the interpolation performed by the OCMYK interpolator 112 to obtain an interpolated Lab output corresponding to the five color dimensions of CMYKO within the six color dimension CMYKOV input 102 of FIG. 1.

Reference is now made to FIG. 2, which is a two dimensional representation of the interpolation performed by the OCMYK interpolator 112 to obtain an interpolated Lab output corresponding to the five color dimensions of CMYKO within the six color dimension CMYKOV input 102 of FIG. 1. The illustrated two dimensional representation 200 corresponds to the processing depicted in the processing flow diagram of FIGS. 3A and 3B as performed by the example OCMYK interpolator 112 of FIG. 1.

The two dimensional representation 200 assumes a constant value of the three values corresponding to the MYK dimensions. The two dimensional representation 200 shows an OMYK axis 220 that contains Lab output values for different input values of Orange given the MYK values of the CMYKOV input. The two dimensional representation 200 further shows a CMYK axis 222 that contains Lab output values for different input values of Cyan given the same MYK values. In one embodiment, values of the OMYK axis 220 are stored in the high resolution OMYK table 106 and values of the CMYK axis 222 are stored in the high resolution CMYK table 108.

Example Flow Diagram

Figure 3A:
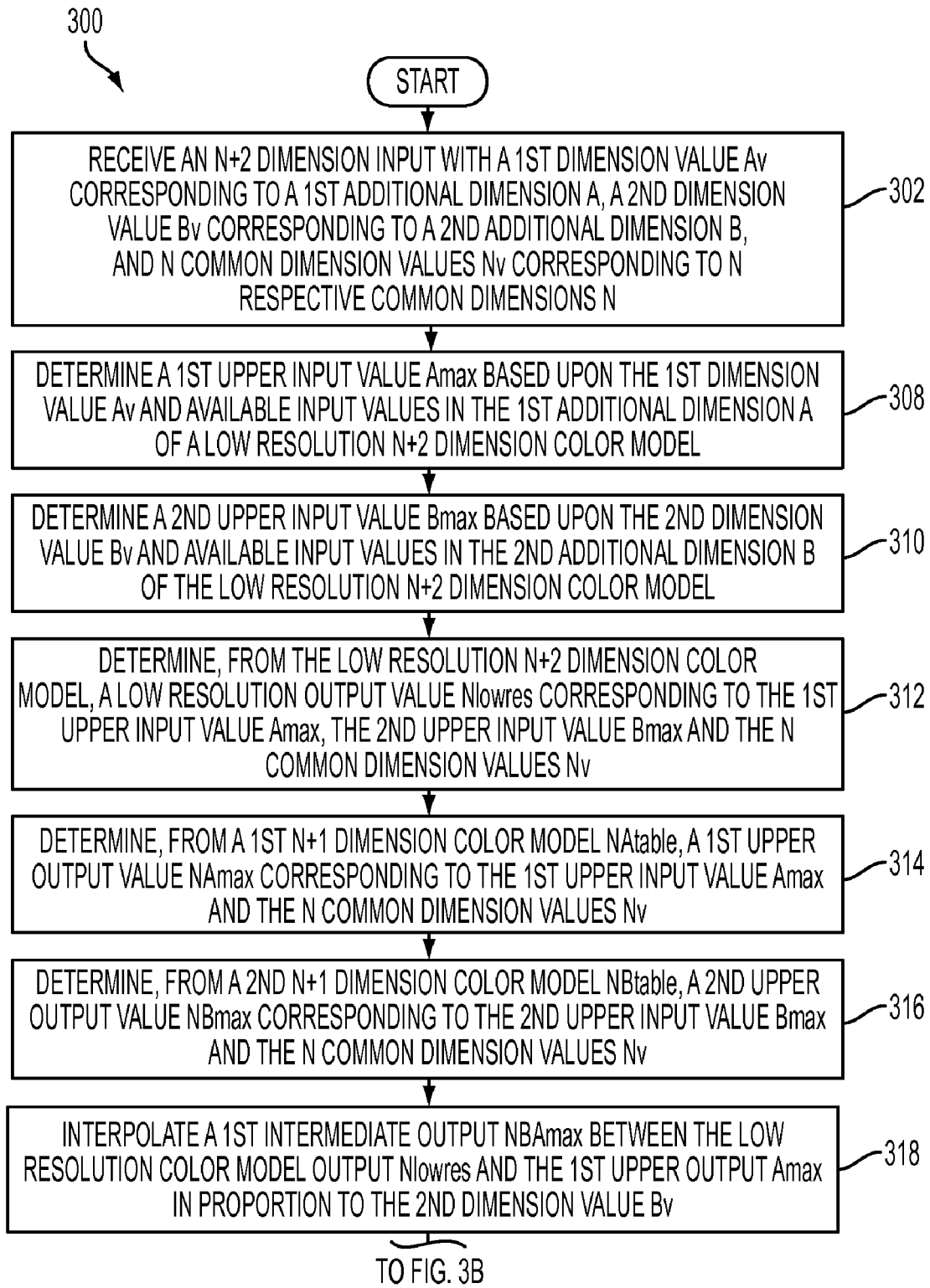
FIGS. 3A and 3B are one example embodiment of the present method for determining a higher dimension color printer model output corresponding to values of an N+2 dimension color model input.
Figure 3B:
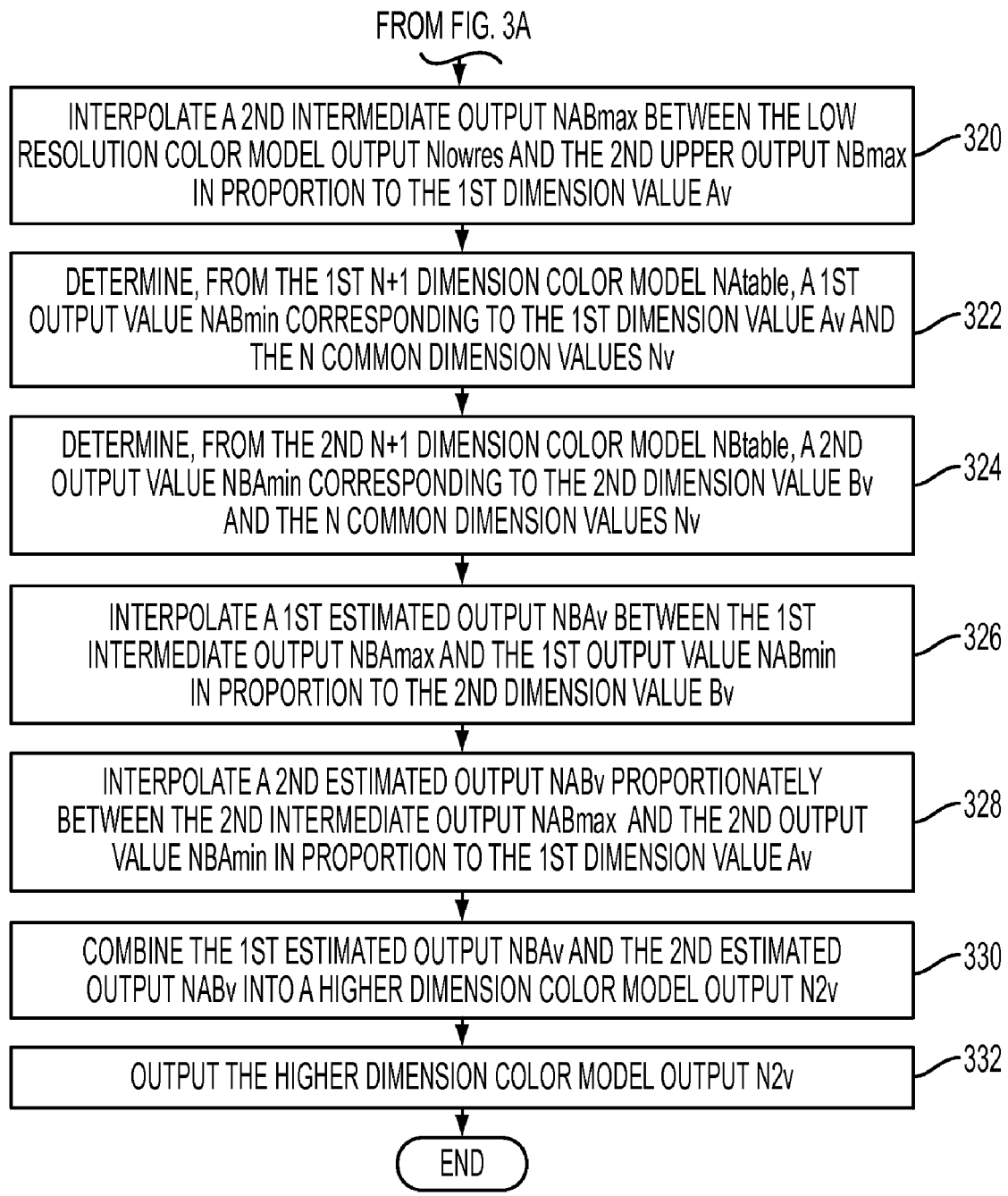

Reference is now being made to the flow diagram of FIGS. 3A and 3B which are one example embodiment of the present method for determining a higher dimension color printer model output corresponding to values of an N+2 dimension color model input.

The example processing flow 300 begins by receiving, at 302, an N+2 dimension input. In the illustrated example corresponding to processing of the OCMYK interpolator 112, the N+2 dimension input contains the five input values for each of the OCMYK color dimensions within the CMYKOV input 102 for which an interpolated output Lab value is to be determined. The N+2 dimension input has a first dimension value, referred to as Av, corresponding to a first additional dimension, referred to as A and which is the Orange dimension in this example. The N+2 dimension input further has a second dimension value, referred to as Bv, corresponding to a second additional dimension, referred to a B and which is the Cyan dimension. In this example, the N+2 dimension input also includes N common dimension values, referred to as Nv, corresponding to N respective common dimensions, referred to as N. In the illustrated example, the N respective common dimensions are the MYK color dimensions and the N common dimension values are the MYK values contained in the CMYKOV input 102. The symbol "Nv" in this example refers to a three value vector, whereas the symbol "Av" and "Bv" each refers to a respective scalar value.

As illustrated in FIG. 1, the CMYKOV input 102 is provided to the low resolution CMYKOV table 104, which stores Lab output values for a relatively small number of levels of each of the CMYKOV possible input values. In one example, the low resolution CMYKOV table 104 stores Lab output values for two levels of each CMYKOV value. In one embodiment these two levels are zero, i.e., no level of that colorant, and the full value of that colorant.

In the example method, the low resolution CMYKOV table 104 produces Lab output data for particular input values of each dimension of the CMYKOV color space. In order to produce the Lab output from the low resolution CMYKOV table 104, one embodiment of the present method determines, for each color dimension, an upper range input value for that dimension that is closest to and greater than the input value of that color dimension for which data is produced by the low resolution higher dimension color model as stored in the low resolution CMYKOV table 104.

The example method determines, at 308, a first upper range input value, referred to as Amax, from the Orange value within the CMYKOV input values 102. At 310, a second upper range input value, referred to as Bmax, is determined from the Cyan value within the CMYKOV input values 102. In one embodiment, color dimension values that correspond to inputs of the low resolution CMYKOV table 104 are defined within the processing and comparisons are made to the input values to determine the corresponding upper range input values.

In the example of the present method, as is described above in reference to FIG. 2, the low resolution CMYKOV table 104 stores and produces low resolution output values 202 that contain Lab output values that correspond to upper range input values, such as Amax and Bmax, determined from CMYKO values within the CMYKOV input values 102. At 312, a low resolution output value, referred to as Nlowres, corresponding to the first upper input value Amax, the second upper input value Bmax and input values corresponding to the N common dimension values Nv is determined from the low resolution CMYKOV table 102, which includes data for a low resolution N+2 dimension color model. In one example, the low resolution CMYKOV table 102 is used as a low resolution CMYKO color model by setting the Violet input value to zero.

The OCMYK interpolator 112 accesses Lab output values stored for the four input color dimensions of each of the OMYK table 106, which is referred to as the NAtable, and the CMYK table 108, which is referred to as the NBtable. The present discussion assumes that the MYK values, referred to as Nv, are equal to those in the received CMYKOV input. In this context, the OMYK table 106, the NAtable, and the CMYK table 108, the NBtable, accept input values that share the MYK color dimensions and have inputs that differ only by input values for the Orange color dimension and the Cyan color dimension. The OCMYK interpolator 112 interpolates Lab output values that are produced by the OMYK table 106 (NAtable), CMYK table 108 (NBtable), and the low resolution CMYKOV table 104 for the corresponding input color dimension values of the CMYKOV input values 102.

The low resolution output values 202, Nlowres, which are output Lab values from the low resolution CMYKOV table 104, are provided to the OCMYK interpolator 112 along with the first upper input value Amax and the second upper input value Bmax. The first upper input value Amax and the second upper input value Bmax correspond, respectively, to the input values of the Orange dimension and the Cyan dimension that correspond to the low resolution output values 202. At 314, a first upper output value 204 NAmax corresponding to the first upper input value Amax and the N common dimension values Nv is determined by the OCMYK interpolator 112 by retrieving Lab output values from the high resolution OMYK table 106 NAtable that are stored for the first upper input value Amax and the MYK input values Nv. At 316, a second upper output value 206 NBmax corresponding to the second upper input value Bmax and the N common dimension values Nv is determined by the OCMYK interpolator 112 by retrieving Lab output values from the high resolution CMYK table 108 NBtable that are stored for the second upper input value Bmax and the MYK input values Nv.

In one embodiment, a first intermediate output value 210, referred to as NBAmax, is interpolated, at 318, between the low resolution output values 202 Nlowres and the first upper output value 204 NAmax in proportion to the second additional color dimension value Bv. In the illustrated example, an intermediate Lab value is interpolated between the low resolution output values 202 Nlowres and the first upper output value 204 NAmax that is on the OMYK axis in proportion to the value for Cyan, or Av in this example, in the CMYKOV input 102.

A second intermediate output value 208, referred to as NABmax, is interpolated, at 320, between the low resolution output values 202 Nlowres and the second upper output value 206 NBmax in proportion to the first additional color dimension value Av. In the illustrated example, an intermediate Lab value is interpolated between the low resolution output values 202 Nlowres and the second upper output value NBmax that is on the CMYK axis in proportion to the value for Orange, or Bv in this example, in the CMYKOV input 102.

An alternative embodiment of the present method uses alternative techniques to determine the first intermediate output value 210 NBAmax and the second intermediate output value 208 NABmax. For example, one alternative embodiment replaces the processing described above for 312 through 320 by interpolation within the low resolution CMYKOV table 104. In one alternative example, the first intermediate output value 210 NBAmax and the second intermediate output value 208 NABmax are determined by interpolation of values stored within the low resolution CMYKOV table 104. In such embodiments, the processing does not directly use the low resolution output values 202 Nlowres, NBmin 204 and NAmin 206.

At 322, first Lab output values 212, referred to as NABmin, corresponding to the first additional color dimension value Av and the N common dimension input values Nv are determined. In the illustrated example, first Lab output values NABmin corresponding to the OMYK values within the CMYKOV input 102 are determined from the high resolution OMYK table 106 NAtable. At 324, second Lab output values 214, referred to as NBAmin, corresponding to the second additional dimension input value Bv and the N common dimension input values Nv is determined. In the illustrated example, first Lab output values NBAmin corresponding to the CMYK values within the CMYKOV input 102 are determined from the high resolution CMYK table 108 NBtable.

A first estimated output value, referred to as NBAv, is interpolated, at 326, between the first intermediate output value 210 NBAmax and the second Lab output value 214 NABmin in proportion to the first additional color dimension value Av, which is the value for Orange in the CMYKOV input 102. A second estimated output value, referred to as NABv, is interpolated, at 328, between the second intermediate output value 208 NABmax and the first output value 212 NBAmin in proportion to the second additional color dimension value Bv, which is the value for Cyan in the CMYKOV input 102.

At 330, the first estimated output value NBAv and the second estimated output value NABv are combined into a higher dimension color model output, which is referred to as N2v. Combining the first estimated output value NBAv and the second estimated output value NABv is performed in one example such that the average value of the combination goes to NBAmin as Av goes to zero, and goes to NABmin as Bv goes to zero. The higher dimension color model output N2v is then output, at 332, from the OCMYK interpolator 112.

In one embodiment, first estimated output value NBAv and the second estimated output value NABv are combined according to a weighted average based, respectively, upon the first addition color dimension value Av and the second additional color dimension value Bv. In the OCMYK case described above, the OMYK oriented first estimated output value NBAv and the CMYK oriented second estimated output value NABv are combined as follows:

$$\mathrm{Lab}(OCMYK) = (O*NABv) + (C*NBAv)/(O+C) \quad (1)$$

where Lab(OCMYK) is the higher dimension color model output, O is the value for the Orange color dimension in the CMYKOV input 102, and C is the value for the Cyan color dimension in the CMYKOV input.

The first estimated output value NBAv, the second estimated output value NABv and the higher dimension color model output N2v are generally located in a vicinity of the interpolation intersection 216. However, due to the nonlinear nature of the printer response, these two values will usually be different. The combining of these values, as describe above, provides a refinement to the Lab output value.

The above described processing describes the production of a higher dimension color model output by the OCMYK interpolator 112 based upon the received OCMYK input values. The VCMYK interpolator 114 performs processing similar to that described above for the OCMYK interpolator 112 to produce a second higher dimension color model output, except that the Violet color dimension input is used in place of the Orange color dimension output. The VCMYK interpolator extracts data from the high resolution CMVK table 110 instead of the high resolution OMYK table 106 and combines it with data from the high resolution CMYK table 108 and low resolution CMYKOV table 104 to produce interpolated Lab output values based upon the VCMYK dimension values contained within the CMYKOV input.

In one example embodiment, the outputs from the OCMYK interpolator 112 and the VCMYK interpolator are provided to a CMYKOV interpolator 116, which determines a third higher dimension color model output based upon interpolation between the higher dimension color model output produced by the OCMYK interpolator 112, the second higher dimension color model output produced by the VCMYK interpolator, and intermediate values determined based upon data within the low resolution higher dimension color model 104. The CMYKOV interpolator performs interpolation processing similar to that described above for the OCMYK interpolator and illustrated in FIGS. 3A and 3B. In one example, the CMYKOV interpolator accepts the CMYKOV input, at 302, as the N+2 dimension input, and the N respective common dimensions, referred to as N, correspond to the CMYK input color dimensions. The first additional dimension A of an example CMYKOV interpolator is the Orange color dimension and the second additional dimension B is the Violet color dimension. In one example, the CMYKOV interpolator determines a first upper output value Amax, at 314, and a first output value NABmin, at 322, by providing, respectively, the first upper input value Amax and the first dimension input value Av for the Orange color dimensions to the OCMYK interpolator. Similarly, the CMYKOV interpolator determines a second upper output value Bmax, at 316, and a second output value NBAmin, at 324, by providing, respectively, the second upper input value Bmax and the second dimension input value Bv for the Violet color dimensions to the VCMYK interpolator 114. The CMYKOV interpolator then outputs, at 332, the higher dimension Lab output value based upon the higher resolution model data stored in the high resolution OMYK table 106, the high resolution CMYK table 108, and the high resolution CMVK table 110.

One example of a low resolution CMYKOV table 104 stores output Lab values for two values of each input color dimension. In one example, low resolution CMYKOV table stores values for input values that are equal to either zero or a maximum value for a color dimension input value. In one example, eight bits are used to represent each color dimension value, and therefore the low resolution CMYKOV table stores output Lab values for input values that are either zero or 255. In this context, the upper range input values are 255.

An alternative embodiment of the present method includes a low resolution CMYKOV table 104 that encodes a model with output Lab values for input values of each color dimension that each have three levels. In an example of an eight bit value for each color dimension, these three levels in one example are 0, 128, and 255. Using such a low resolution CMYKOV table 104 allows greater accuracy in the interpolated output values.

Example Four Quadrant Color Space

Figure 4:
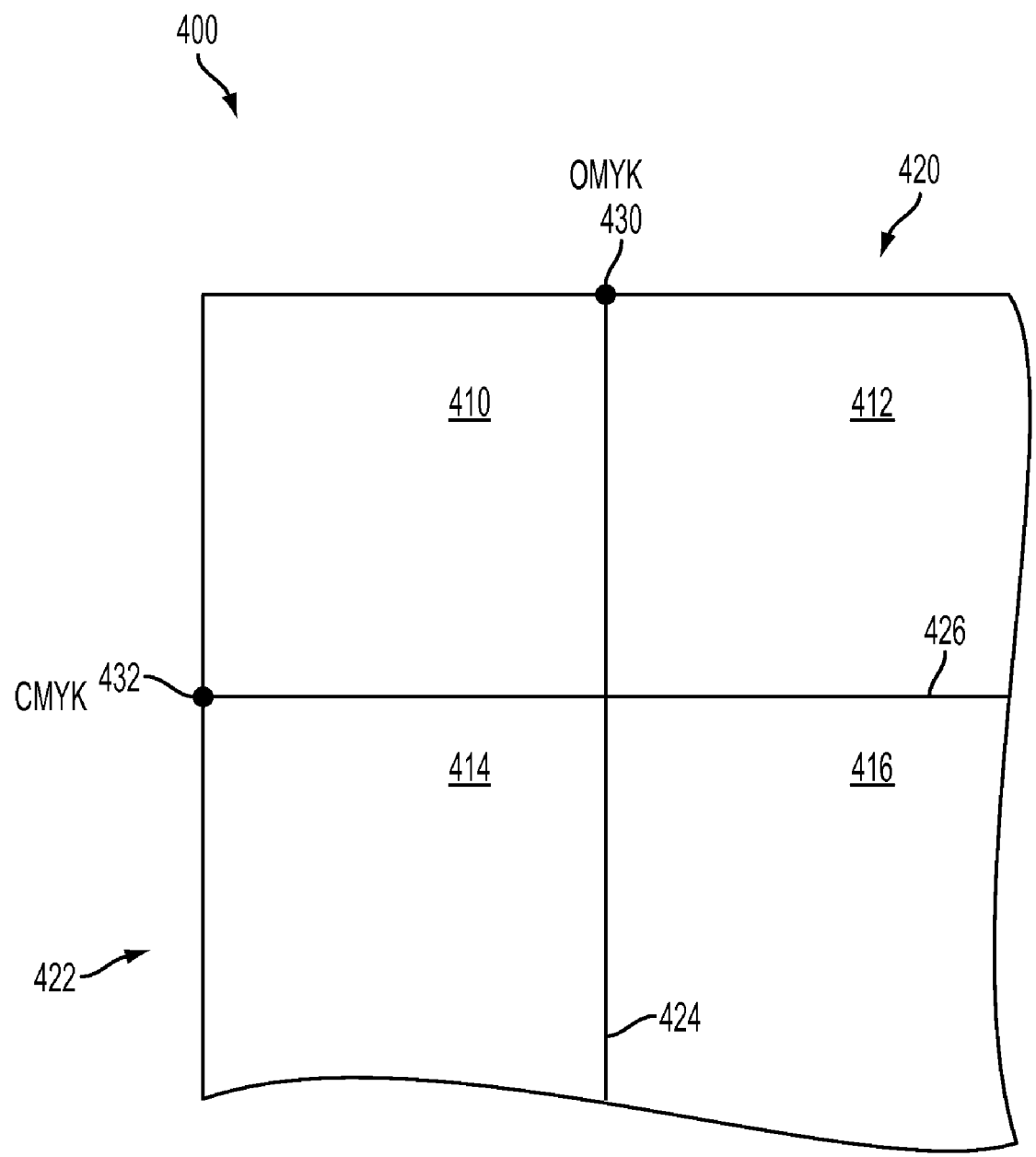
FIG. 4 is a four quadrant color space domain used by an alternative embodiment of the present method.

Reference is now made to FIG. 4, which illustrates a four quadrant color space domain 400 used by an alternative embodiment of the present method. One example of the present method uses a low resolution CMYKOV table 104 with output values stored for three input levels of each color dimension. In this example, a five color model that combines the outputs of two, four color models, such as is performed by the OCMYK interpolator 112, divides the input value region that contains the first additional color dimension value, such as Orange, and the second additional color dimension value, such as Cyan, into four quadrants. In the illustrated example, eight bits of data are used to store each color dimension value. An Orange mid-level point 430 is shown where the Orange value is equal to 128. A Cyan mid-level point 432 is shown where the Cyan value is equal to 128.

A first quadrant 410 in this example includes the relationship where the value of both the Orange color dimension and the Cyan color dimension are less than 128, i.e., for values of Orange and Cyan that are both less than the Orange mid-level point and the Cyan mid-level point, respectively. A fourth quadrant in this example is where these dimensions both have values greater than 128, i.e., for values of Orange and Cyan that are both greater than the Orange mid-level point and the Cyan mid-level point, respectively. A second quadrant in this example is defined where only the Orange value is greater than 128, i.e., for values of Orange that are greater than the Orange mid-level point and the values of Cyan are less than the Cyan mid-level point. A third quadrant is defined where only the Cyan value is greater than 128, i.e., for values of Orange that are less than the Orange mid-level point and the values of Cyan are greater than the Cyan mid-level point.

This example embodiment determines output Lab values in the second quadrant 412 by linear interpolation of the Cyan value using Lab output values that are determined for the specified MYKO input values and with Cyan values of zero and 128. More specifically, values are determined along the OMYK axis 420 and the OMYK mid-level Cyan value axis 426, and a linear interpolation is performed based on the input value of the Cyan dimension. The processing to determine output Lab values in the second quadrant is similar to that described above with regards to FIGS. 3A and 3B for determining the first estimated output value NBAv at 313, 322, and 326.

Lab output values in the third quadrant 414 are similarly determined by linear interpolation of the Orange value using Lab output values that are determined for the specified CMYK input values and with Orange values of zero and 128. More specifically, values are determined along the CMYK axis 422 and the CMYK mid-level Cyan value axis 424, and a linear interpolation is performed based on the input value of the Orange dimension. The processing to determine output Lab values in the third quadrant is similar to that described above with regards to FIGS. 3A and 3B for determining the second estimated output value NABv at 320, 324, and 328. One example of the present method determines output Lab values in the fourth quadrant 416 by using multihedral interpolation of data contain in, for example, the low resolution CMYKOV table 104, as is familiar to practitioners of ordinary skill in the relevant arts in light of the present discussion.

One example of the present method that uses a low resolution CMYKOV table 104 with output values stored for three input levels of each color dimension uses an alternative method to determine output Lab values in the first quadrant. The alternative method obviates a condition that would arise if the above combining method described with regards to FIG. 2 were used. In particular, at the boundary between the first quadrant and either the second quadrant or the third quadrant, the output Lab values in the first and second quadrants are determined by linear interpolation, while one end of the two functions that are blended in the first quadrant by the above described method is determined by multihedral interpolation.

For example, at the boundary between the first quadrant and the third quadrant (i.e., the OMYK mid-level Cyan value axis 426), the output Lab values determined for input values in the third quadrant are calculated by interpolating, based on the input value for Orange, between two Lab output values for the given MKY input values and two fixed input values of Orange, i.e., for values of Orange that equal 0 and 128. In an embodiment that determines values in the first quadrant by using the combination of values described above in equation 1, the contribution of the interpolation, based on the value of Cyan, between two Lab values for the given MKY input values and two fixed input values of Cyan, i.e., for values of Cyan that equal 0 and 128, is not zero. Furthermore, the first estimated output value at the boundary between the first quadrant and the third quadrant is determined by multihedral, not linear, interpolation. The alternative method of one embodiment to determine Lab output values in the first quadrant therefore uses the following equation:

$$\text{Lab}(OCMYK) = (f^{*2}\text{nd estimated output}) + (1-f)^*(1\text{ st estimated output}) \quad (2)$$

where $$f = a^*(1-b)/(a+b-2^*a^*b) \quad (3)$$

$$b = \text{Cyan}/128 \quad (4)$$

$$a = \text{Orange}/128 \quad (5)$$

Using these relationships, f equals zero when Orange equals zero, so we use the first estimated output value, as desired. However, f also equals zero when Cyan equals 128 at the boundary between quadrant 0 and quadrant 2. At this boundary we use only first estimated output value as well. Since this is the function used in the third quadrant, the function is continuous across this boundary. The above expressions become unbounded when Orange and Cyan input values are both equal to zero, or when Orange and Cyan are equal to 128. In these cases, the solution in known and special processing is used to produce the output. In one example, Lab(MYK) is used when both Orange and Cyan input values are both equal to zero. When Orange and Cyan are both equal to 128, values from the low resolution CMYKOV table are used.

Various Embodiments

Figure 5:
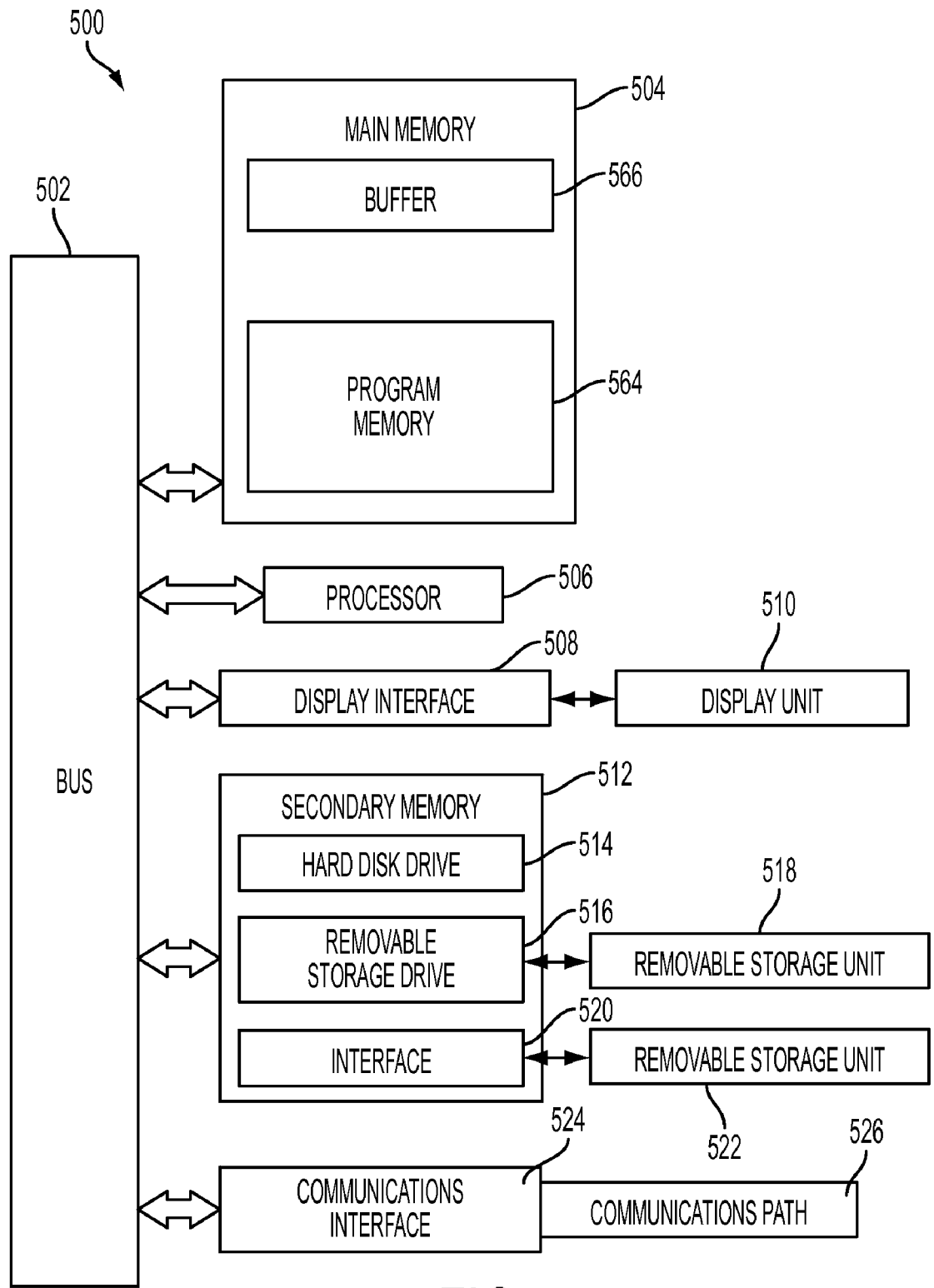
FIG. 5 illustrates a block diagram of one example embodiment of a special purpose computer useful for implementing one or more aspects of the present method.

Reference is now made to FIG. 5 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described in the illustrated embodiments of FIGS. 1 and 2, and the flow diagram of FIGS. 3A and 3B.

Special purpose computer system 500 includes processor 506 for executing machine executable program instructions for carrying out all or some of the present method. The processor is in communication with bus 502. The system includes main memory 504 for storing machine readable instructions. Main memory may comprise random access memory (RAM) to support reprogramming and flexible data storage. Buffer 566 stores data addressable by the processor. Program memory 564 stores machine readable instructions for performing the present method. A display interface 508 forwards data from bus 502 to display 510. Secondary memory 512 includes a hard disk 514 and storage device 516 capable of reading/writing to removable storage unit 518, such as a floppy disk, magnetic tape, optical disk, etc. Secondary memory 512 may further include other mechanisms for allowing programs and/or machine executable instructions to be loaded onto the processor. Such mechanisms may include, for example, a storage unit 522 adapted to exchange data through interface 520 which enables the transfer of software and data. The system includes a communications interface 524 which acts as both an input and an output to allow data to be transferred between the system and external devices such as a color scanner (not shown). Example interfaces include a modem, a network card such as an Ethernet card, a communications port, a PCMCIA slot and card, etc.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for determining a high dimension color printer model output, the method comprising:
   maintaining a first N+1 dimension color model for a first N+1 color dimensions and a second N+1 dimension color model for a second N+1 color dimensions, the first N+1 color dimensions and the second N+1 color dimensions each comprising N common color dimensions and, respectively, a first additional color dimension and a second additional color dimension being different from and representing a complementary color of a color represented by the first additional color dimension;
   maintaining a low resolution higher dimension color model for at least N+2 dimensions comprising the first additional color dimension, the second additional color dimension, and the N common color dimensions, wherein the low resolution higher dimension color model has fewer calibrated data nodes for substantially fewer input values per dimension than the first N+1 dimension color model and the second N+1 dimension color model;
   accepting a higher dimension color model input comprising at least N+2 values corresponding to a first additional color dimension value, a second additional color dimension value, and N common color dimensions values;
   determining, based upon data stored in the low resolution higher dimension color model, a first intermediate output and a second intermediate output;
   determining a first N+1 dimension color model output and a second N+1 dimension color model output corresponding to the N common color dimension values and, respectively, to the first additional color dimension value and the second additional color dimension value using, respectively, the first N+1 dimension color model and the second N+1 dimension color model;
   interpolating a first estimated output and a second estimated output corresponding, respectively, to an output proportionately between, based upon the second additional color dimension value, the first intermediate output and the second N+1 dimension color model output, and a value proportionately between, based upon the first additional color dimension value, the second N+2 dimensional intermediate output and the first N+1 dimension color model output;
   combining, into a higher dimension color model output, the first estimated output and the second estimated output in respective proportion to the first additional color dimension value and the second additional color dimension value; and
   outputting the higher dimension color model output.

2. The method of claim 1, wherein outputs of the first N+1 dimension color model, the second N+1 dimension color model and the low resolution higher dimension color model comprise Lab color space values.

3. The method of claim 1, wherein each of the N-common color dimensions, the first additional color dimension and the second additional color dimension are different from one another and are each one of violet, cyan, orange, magenta, yellow and black.

4. The method of claim 1, wherein the combining comprises determining a weighted average of the first estimated value and the second estimated value based upon the first additional color dimension value and the second additional color dimension value.

5. The method of claim 1, wherein determining the first intermediate output and the second intermediate output comprises interpolating, based respectively upon the second additional color dimension value and the first additional color dimension value, between values stored in the low resolution higher dimension color model.

6. The method of claim 1, wherein the higher dimension color model input comprises at least N+3 dimensions and further comprises a third additional color dimension value,
wherein the low resolution higher dimension color model is for at least N+3 dimensions, the N+3 dimensions further comprising the third additional color dimension, and wherein the method further comprises:
maintaining a third N+1 dimension color model for a third N+1 color dimensions, the third N+1 color dimensions comprising the second additional color dimension, the third additional color dimension, and N−1 common color dimensions within the N common color dimensions;
determining a second higher dimension color model output based upon interpolation between the second N+1 dimension color model output, a third N+1 dimension color model output, and intermediate values determined based upon data within the low resolution higher dimension color model, wherein the third N+1 dimension color model corresponding to the N−1 common color dimensions, the second additional color dimension value, and the third additional color dimension value using the third N+1 dimension color model; and
determining a third higher dimension color model output based upon interpolation between the higher dimension color model output, the second higher dimension color model output, and intermediate values determined based upon data within the low resolution higher dimension color model.

7. The method of claim 1, wherein determining the first intermediate output and the second intermediate output comprises:
determining a low resolution higher dimension color model output corresponding to the N common color dimensions values, a first upper range input value that is closest to and greater than the first additional color dimension value and for which data is produced by the low resolution higher dimension color model, and a second upper range input value that is closest to and greater than the second additional color dimension value and for which data is produced by the low resolution higher dimension color model;
determining a first upper range output and a second upper range output using, respectively, the first N+1 dimension color model and the second N+1 dimension color model based upon the N common color dimension values and, respectively, the first upper range input value and the second upper range input value; and
interpolating the first intermediate output and the second intermediate output as being are proportionately between, based respectively upon the second additional color dimension value and the first additional color dimension value, the low resolution N+2 color model output and, respectively, the first N+1 upper range output and the second N+1 dimension color model output.

8. The method of claim 7, wherein the interpolating the first intermediate value and the second intermediate value are performed in response to the second additional color dimension value and the first additional color dimension value each being below a pre-determined threshold.

9. The method of claim 7, wherein the interpolating the first intermediate value is performed in response to the second additional color dimension value being below a pre-determined threshold.

10. A system for determining a high dimension color printer model output, the system comprising:
a memory;
a storage medium for storing data; and
a processor in communication with said storage medium and said memory, said processor executing machine readable instructions for performing the method of:
maintaining a first N+1 dimension color model for a first N+1 color dimensions and a second N+1 dimension color model for a second N+1 color dimensions, the first N+1 color dimensions and the second N+1 color dimensions each comprising N common color dimensions and, respectively, a first additional color dimension and a second additional color dimension being different from and representing a complementary color of a color represented by the first additional color dimension;
maintaining a low resolution higher dimension color model for at least N+2 dimensions comprising the first additional color dimension, the second additional color dimension, and the N common color dimensions, wherein the low resolution higher dimension color model has fewer calibrated data nodes for substantially fewer input values per dimension than the first N+1 dimension color model and the second N+1 dimension color model;
accepting a higher dimension color model input comprising at least N+2 values corresponding to a first additional color dimension value, a second additional color dimension value, and N common color dimensions values;
determining, based upon data stored in the low resolution higher dimension color model, a first intermediate output and a second intermediate output;
determining a first N+1 dimension color model output and a second N+1 dimension color model output corresponding to the N common color dimension values and, respectively, to the first additional color dimension value and the second additional color dimension value using, respectively, the first N+1 dimension color model and the second N+1 dimension color model;
interpolating a first estimated output and a second estimated output corresponding, respectively, to an output proportionately between, based upon the second additional color dimension value, the first intermediate output and the second N+1 dimension color model output, and a value proportionately between, based upon the first additional color dimension value, the second N+2 dimensional intermediate output and the first N+1 dimension color model output;
combining, into a higher dimension color model output, the first estimated output and the second estimated output in respective proportion to the first additional color dimension value and the second additional color dimension value; and
outputting the higher dimension color model output.

11. The system of claim 10, wherein outputs of the first N+1 dimension color model, the second N+1 dimension color model and the low resolution higher dimension color model comprise Lab color space values.

12. The system of claim 10, wherein each of the N-common color dimensions, the first additional color dimension and the second additional color dimension are different from one another and are each one of violet, cyan, orange, magenta, yellow and black.

13. The system of claim 10, wherein the combining comprises determining a weighted average of the first estimated value and the second estimated value based upon the first additional color dimension value and the second additional color dimension value.

14. The system of claim 10, wherein determining the first intermediate output and the second intermediate output comprises: determining a low resolution higher dimension color model output corresponding to the N common color dimensions values, a first upper range input value that is closest to and greater than the first additional color dimension value and for which data is produced by the low resolution higher dimension color model, and a second upper range input value that is closest to and greater than the second additional color dimension value and for which data is produced by the low resolution higher dimension color model; determining a first upper range output and a second upper range output using, respectively, the first N+1 dimension color model and the second N+1 dimension color model based upon the N common color dimension values and, respectively, the first upper range input value and the second upper range input value; and interpolating a first intermediate output and a second intermediate output that are proportionately between, based respectively upon the second additional color dimension value and the first additional color dimension value, the low resolution N+2 color model output and, respectively, the first N+1 upper range output and the second N+1 dimension color model output.

15. The system of claim 14, wherein the interpolating the first intermediate value and the second intermediate value are performed in response to the second additional color dimension value and the first additional color dimension value each being below a pre-determined threshold.

16. The system of claim 14, wherein the interpolating the first intermediate value is performed in response to the second additional color dimension value being below a pre-determined threshold.

17. A method for determining a high dimension color printer model output, the method comprising:
  maintaining a first four dimension color model for a first four color dimensions and a second four dimension color model for a second four color dimensions, the first four color dimensions and the second four color dimensions each comprising three common color dimensions and, respectively, a first additional color dimension and a second additional color dimension being different from and representing a complementary color of a color represented by the first additional color dimension;
  maintaining a low resolution higher dimension color model for at least five dimensions comprising the first additional color dimension, the second additional color dimension, and the three common color dimensions, wherein the low resolution higher dimension color model has fewer calibrated data nodes for substantially fewer input values per dimension than the first four dimension color model and the second four dimension color model;
  accepting a higher dimension color model input comprising at least five values corresponding to a first additional color dimension value, a second additional color dimension value, and three common color dimensions values;
  determining a low resolution higher dimension color model output corresponding to the three common color dimensions values, a first upper range input value that is closest to and greater than the first additional color dimension value and for which data is produced by the low resolution higher dimension color model, and a second upper range input value that is closest to and greater than the second additional color dimension value and for which data is produced by the low resolution higher dimension color model;
  determining a first upper range output and a second upper range output using, respectively, the first four dimension color model and the second four dimension color model based upon the three common color dimension values and, respectively, the first upper range input value and the second upper range input value;
  interpolating a first intermediate output and a second intermediate output that are proportionately between, based respectively upon the second additional color dimension value and the first additional color dimension value, the low resolution five color model output and, respectively, the first four upper range output and the second four dimension color model output;
  determining a first four dimension color model output and a second four dimension color model output corresponding to the three common color dimension values and, respectively, to the first additional color dimension value and the second additional color dimension value using, respectively, the first four dimension color model and the second four dimension color model;
  interpolating a first estimated output and a second estimated output corresponding, respectively, to an output proportionately between, based upon the second additional color dimension value, the first intermediate output and the second four dimension color model output, and a value proportionately between, based upon the first additional color dimension value, the second five dimensional intermediate output and the first four dimension color model output;
  combining, into a higher dimension color model output, the first estimated output and the second estimated output in respective proportion to the first additional color dimension value and the second additional color dimension value; and
  outputting the higher dimension color model output.

18. The method of claim 17, wherein the combining comprises determining a weighted average of the first estimated value and the second estimated value based upon the first additional color dimension value and the second additional color dimension value.

19. The method of claim 17, wherein the interpolating the first intermediate value and the second intermediate value are performed in response to the second additional color dimension value and the first additional color dimension value each being below a pre-determined threshold.

20. The method of claim 17, wherein the low resolution higher dimension color model is implemented in a look-up table that stores two output color space values for one of two and three levels of each respective input color dimension value.

* * * * *